April 27, 1965  K. RAMBACHER ETAL  3,180,223
GYRO ROTOR WINDING DEVICE
Filed Nov. 28, 1962

INVENTORS
*Klaus Rambacher*
*Ernst Beier*
By McGlew and Toren
ATTORNEYS

United States Patent Office 3,180,223
Patented Apr. 27, 1965

3,180,223
GYRO ROTOR WINDING DEVICE
Klaus Rambacher and Ernst Beier, Munich, Germany, assignors to Bölkow-Entwicklungen Kommanditgesellschaft, Ottobrunn, near Munich, Germany
Filed Nov. 28, 1962, Ser. No. 240,543
Claims priority, application Germany, Dec. 8, 1961, B 65,098
19 Claims. (Cl. 89—1.7)

This invention relates in general to winding or starting devices and in particular to a new and useful winding up device for a gyro rotor, and particularly for a device of this nature for winding up a gyro employed in a flying body.

The present invention is particularly directed to a gyro which is operated by accelerating the rotor thereof to an extremely high rotary speed within fractions of seconds and then permitting the operation thereof at a constantly decreasing speed. With gyros of this nature, it is necessary to provide means for rapidly accelerating a so-called "shooting" of the gyro. Such means require an energy source and energy converting and transmitting means which are available for a brief period.

One of the known means for operating a gyro of this nature is by means of a rope or cord which is wound on the gyro rotor and is rapidly drawn off in an impact-like or jolt-like manner. With manual operation of this type, it is necessary for an operator to stand directly in the vicinity of the flying body. If the winding up of the gyro is accomplished by the starting of the flying body, then the acceleration of the gyro rotor is, of course, dependent on the acceleration of the starting flying body. The association or coupling of the acceleration characteristics dependent on extraneous factors causes difficulties in the dimensioning of the gyro bearings. In addition, in both of the methods described above, danger of the adverse affects of manual influence is very great. For example, it may occur that while preparing the flying body for starting, the cord which is wound on the gyro rotor is drawn off for a certain amount of length. This means that the gyro rotor may be loosened from its arresting means and thus cannot any longer be drawn up in the desired manner thereafter. Another disadvantage which is more apparent is that when the rope is drawn off, the undesirable deflections of the gyro rotor cannot be prevented.

In accordance with the present invention, there is provided a starting device for a gyro rotor which includes a motor which is advantageously operated, for example, by means of a powder charge to supply the necessary tangential thrust for the rapid acceleration of the gyro rotor. The complete winding up mechanism is advantageously contained in the rear portion of the flying body incorporated as part of the fuselage which is held on by releasable means which eject or release the winding up mechanism after the flying body has been started. The arrangement is such that the powder motor which operates the winding drum and the associated mechanism are incorporated in a severable portion of the fuselage which automatically becomes disconnected from the flying body fuselage by the actuation of a holding device which upon starting of the gyro rotor is automatically released. The release is facilitated by means of a spring which is latched between the flying body fuselage and the severable portion and which is effective to eject the severable portion after the holding device is released upon the completion of the operation of the winding up mechanism.

In accordance with a preferred arrangement, the powder motor is arranged on a casing bottom which covers the rear end of the flying body fuselage. The winding mechanism is contained in said casing bottom which forms a moisture-tight cover for the flying body fuselage and forms an efficient protection for the engine and other structural components which are arranged in the tail of the flying body fuselage. This protection remains in association with the flying body until it is operated, at which time it is disassociated therefrom by automatically operable means. Thus, the flying body or missile is protected for long periods of time which are usually necessary for storing the missile in readiness for launching.

The holding device or release mechanism for the gyro winding up means which is stored in the fuselage extension or bottom includes a pivotally mounted stirrup which is arranged with one leg engaging in a recess formed in the adjacent end of the flying body for holding the bottom portion thereto. The powder motor is advantageously provided with an axis or shaft extension, which rotates upon operation of the powder motor to displace a nut member which, in turn, causes unlatching of the latch member and release of the bottom portion. The nut member is oriented so that the release occurs after the winding up of the gyro has been completed. Winding of the gyro is accomplished by rotation of a winding drum driven by the powder motor, the drum being connected to the gyro through a strip of material which is wound up on the drum as it is rotated. The casing bottom which houses the winding up mechanism is preferably provided with a cover or lid which forms a substantially gas-tight enclosure for the flying body. The casing has a pressure and heat sensitive membrane extending across an open portion which will burst upon exceeding a certain pressure and temperature. In addition, a gas-tight guide is provided for the strip connected to the gyro which permits the drawing up of the strip through the casing bottom. The construction is such that the gyro itself and the winding device which includes the powder motor are separated and are located in separate constructional units. The gases which exit from the powder motor during operation cannot act on the gyro or other components of the flying body since the separation therefrom is complete. The powder motor charge is such, in respect to arrangement and size of charge, and in respect to the nozzles and the configuration thereof, that a desired acceleration, time, and operational speed of the gyro rotor will be obtained for proper operation. Strip connections between the winding motor rotor and the gyro rotor are such that a rapid or jolt-like acceleration may be given to the rotor of the gyro without unduly loading the bearings. Since the winding mechanism and the complete casing bottom which houses the same are released from the main portion of the flying body after the gyro has been adequately wound, the flying body may transport a larger useful load than would be possible if the winding mechanism were to be permanently incorporated therein. The construction is such that one or more gyros may be wound in an identical manner by a similar arrangement of winding mechanism.

Accordingly, it is an object of this invention to provide an improved gyro winding device.

A further object of the invention is to provide a winding device for the gyro of a flying body which includes a portion connected to the flying body which is severable therefrom after the gyro has been wound.

A further object of the invention is to provide a device for rapidly winding the rotor of a gyro which includes a powder motor which is rapidly rotated and which includes a winding drum connected to a gyro rotor through a strip member, the complete winding mechanism being contained in a housing which includes means actuated by the rotation of the powder motor rotor to cause ejection of the powder rotor motor and the associated winding mechanism from the main body of the fuselage.

A further object of the invention is to provide a flying body having a severable bottom portion containing means for winding the gyro rotor which is located in the main fuselage and including means responsive to operation of the winding mechanism to cause ejection of the bottom portion of the fuselage.

A further object of the invention is to provide a winding mechanism for a gyro and the like which is simple in deisgn, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 4:
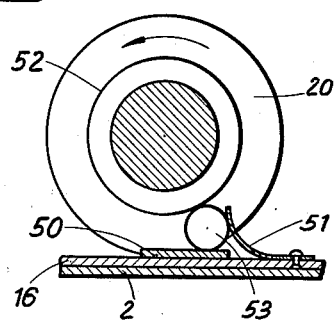
FIG. 4 is a section taken on the line 4—4 of FIG. 2.
Figure 1:
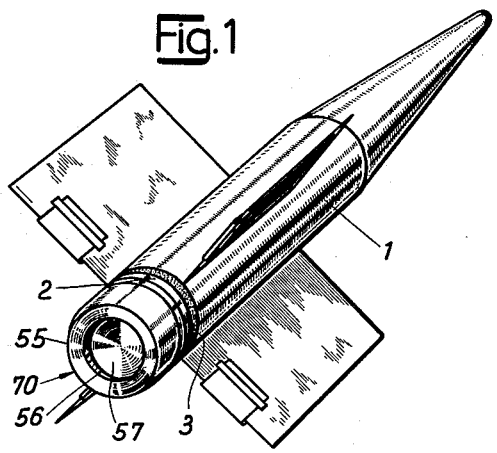
FIG. 1 is a perspective view of a flying body having a winding mechanism formed as a rear severable portion thereof as constructed in accordance with the invention.

Referring to the drawings in particular, the invention embodied therein includes a winding mechanism assembly generally designated 70 for operating a gyro generally designated 72 employed in the stabilization of a flying body or missile generally designated 1.

In the embodiment illustrated, the flying body 1 includes an outer cylindrical wall or outer fuselage 1a and an inner cylindrical wall portion 7. The assembly 70 is held to the fuselage 1a by releaseable means to be described more fully hereinafter. The assembly 70 includes a pan- or dish-shaped end wall 2 which covers the complete end of the flying body and is sealed in respect thereto by means of an outer sealing ring 3 disposed between the outer walls of the assembly and the fuselage 1a and an inner sealing ring 4 disposed between the end of the inner wall 7 and the pan-shaped element 2. A spring 5 is secured to the underside of the element 2 by a rivet 5a at one end and has its opposite end biased against the wall 7 in a manner to urge the separation of the assembly 70 from the fuselage 1a. The assembly 70 is forced onto the fuselage to bias the spring 5 and a resilient clamping element 9 which is riveted at 9a to the element 2 is positioned to lock into a recess 11 formed in an annular ring 8 of the fuselage 1a. The diametrically opposite side of the assembly 70 is locked to the fuselage 1a by means of a stirrup or pivoting lever member 12 which has an extending arm 13 with a latch formation which extends into a recess 14 formed in the ring 8 on the opposite side of the fuselage 1a from the recess 11. The recesses 11 and 14 are advantageously made at diametrically opposite position offset from one another by about 180°.

On the opposite face of the element 2 is mounted a U-shaped bearing bracket or bearing box element 16 which rotatably supports the shafts of a motor such as a powder motor 17. The powder motor advantageously comprises a substantially open-ended cylindrical rotary body 18 having at least two tangential openings 19. The open end of the body 18 is closed by a detachable lid 20 which forms a constructional unit together with a winding drum 22. The lid 20 can advantageously be detached by moving screw connections (not shown).

The powder motor has two shafts 23 and 24 which extend outwardly in opposite directions and which are supported at opposite ends of the bearing 16. A stub shaft 24 merges into a spindle formation 28 having threads thereon on which are threaded a square spindle member or nut 29. Adjustable bearing collars or sleeves 25 and 26 are provided on each end of the bearing support 16 and may be threaded axially thereon for adjustment of the position of the powder motor. By this means the position of the winding drum in relation to the flying body 1 may be adjusted.

Figure 2:
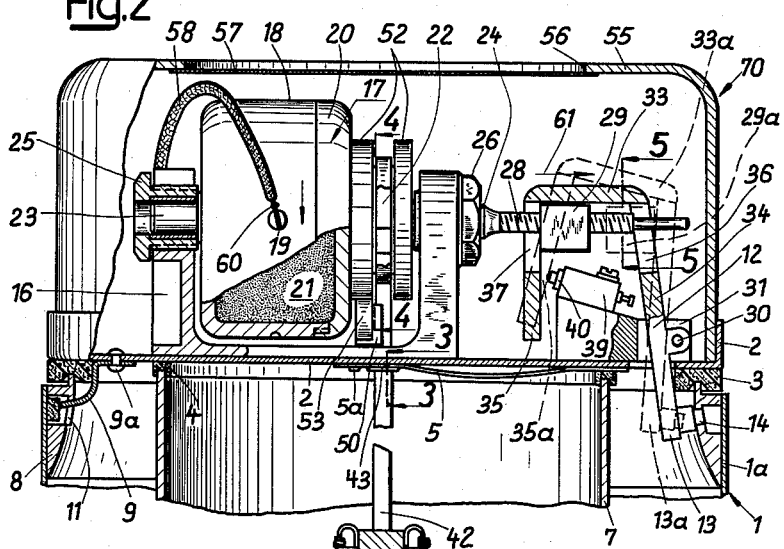
FIG. 2 is an enlarged fragmentary transverse section of the rear portion of the flying body.
Figure 5:
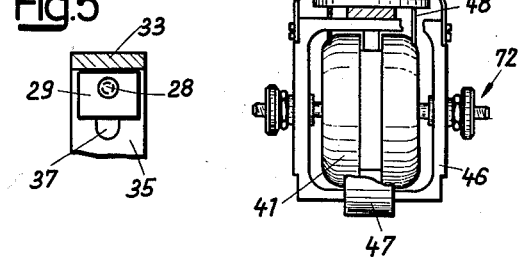
FIG. 5 is a section taken on the line 5—5 of FIG. 2.

The clamping and ejection means which comprises the stirrup 12 is pivotally mounted at 30 on a bearing member 31 which is arranged on the outer face of the element 2. One portion of the stirrup 12 extends within the assembly 70 and includes a U-shaped configuration or portion 33 having legs 34 and 35 provided with cutouts 36 and 37, respectively. The bearing member 31 is located so that the spindle 28 of the stub shaft 24 projects through the cut-outs 36 and 37 of the stirrup. In FIG. 2, the parts are illustrated in the rest position with the nut 29 located adjacent the leg 35. The nut is advantageously advanced on the spindle 28 so that the stirrup 12 is pretensioned. Hence, the motor is secured against inadvertent rotation. A micro-switch 39 is mounted on the bearing member 31 and is provided with a switching pin 40 which is disposed for actuation by the stirrup 12 when it moves from the solid line position to the dotted line position indicated in FIG. 2.

Gyro 72 is advantageously mounted within the flying body 1 at a suitable location, the exact positioning of which is not indicated. In a preferred arrangement, the gyro is mounted by means of an inner and outer cardan ring 46 and 47 and is secured in its rest position against rotational movement by a blocking member 48 which, in a known manner, is fork-shaped. The mounting of the gyro in the flying body fuselage is not shown in detail in the drawings because it does not form any part of the present invention.

Figure 3:
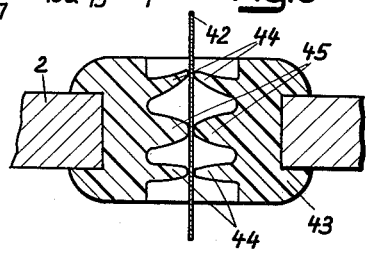
FIG. 3 is a section taken on the line 3—3 of FIG. 2.

A strip 42 of a strong material such as metal is wound around the drum 22 of the winding motor and it extends through a strip guide 43 which may be made of synthetic material, for example. The guide 43 advantageously includes sealing lips 44 which may be made of a thickness and a material so that they are flexible. Relatively wide semi-rigid or stiff guide lips 45 are advantageously centrally located (see FIG. 3).

As indicated in FIG. 4, the powder motor is provided with means for preventing the return rotation thereof which consists of a guide plate 50 which mounts a roller element 53. The roller element 53 is pressed by a spring 51 against the circumference of the disc 52 of the winding drum 22. Thus, the spring loaded gyro blocking means 48 and the turn blocking means 51, 53 hold the metal strip 42 between the gyro rotor 41 and the winding drum 22 under tension so that an impact-free starting of the gyro may be achieved.

The assembly 70 includes a cylindrical casing element 55 which fits into the pan-shaped element 2 and includes an open central portion 56 at the opposite end which is covered by a membrane 57 which will burst under the application of sufficiently high pressure.

The operation of the devices is as follows: After the flying body 1 is made ready for starting, the powder motor 17 is ignited by means of a cable 58 which is connected to a suitable source of electrical current (not shown). Gas is developed or generated from the powder charge 21 in the motor 17 and in so doing causes a rupturing of the soldered connection 60. The powder motor operates and causes the winding drum 22 to wind up the metal strip 42. In doing so, the fork 48 is moved into its inoperative position and the gyro rotor 41 is released and caused to rotate. The acceleration procedure terminates after the metal strip 42 has been wound off the rotor 41 and causes the rotor to obtain proper operational speed. The dimensioning of the length of the strip 42 is such that operational speed will be obtained when it is completely pulled off the rotor. Rotation of the rotor causes the nut 29 to advance along the spindle 28 in the direction of the arrow 61 until the nut assumes the dash line position shown at 29a in FIG. 2. The spindle nut 29 is prevented from rotary movement by means of the U-shaped portion 33 of the stirrup 12. During this movement, the spindle nut moves from the leg 35 of the stirrup 12 to the leg 34 and thereafter takes along the leg 34 of the stirrup until the stirrup assumes the position 33a indicated by dash lines in FIG. 2. The end 13 of the stirrup which is formed as a blocking pin is moved outwardly into the dash line position 13a so that the casing bottom 2 is released and the whole assembly 70 is released from the flying body 1. The outward releasing movement of the assembly 70 is facilitated by the spring 5 which causes an outward ejection thereof. Since the strip 42 has already been wound completely on the winding drum 22, the complete assembly 70 may be removed from the flying body 1.

The arm 35 of the stirrup 12 which has been moved into the position 35a causes actuation of the micro-switch 39. The micro-switch 39 is advantageously connected to the engine of the flying body through a cable (not shown) to cause the starting of the flying body and the effecting of the launching thereof from its pad but without the gyro winding device incorporated therewith.

While a specific embodiment of the invention has been shown and described in detail to illustrate the application of the principles of the invention, it will be understood that the invention may be embodied otherwise without departing from such principles.

What is claimed is:

1. A device for winding the rotor of a gyro which is arranged in a flying body such as a missile, comprising a casing adapted to be connected to the flying body, a winding motor in said casing including an element windable thereby which is adapted to be connected to the gyro for winding the rotor thereof, releasable means holding said casing with said winding motor to said flying body, and means movable upon operation of said winding motor to release said holding means to separate said casing with said winding motor from said flying body.

2. A device according to claim 1, wherein said means holding said casing to said flying body includes a lever mechanism pivoted in said casing and having an arm portion extending outwardly from said casing into latching engagement with said flying body, and wherein said means movable upon operation of said winding motor includes a shaft of said winding motor which is threaded, a nut being threaded on said shaft and displaceable therealong upon rotation of said shaft, said nut being movable to contact said lever mechanism to free the latching end from said flying body upon rotation of said motor by a predetermined amount.

3. A device according to claim 1, including a transmission means disposed between said winding motor and said holding means which comprises said means movable upon actuation of said winding motor, including a member displaceable upon rotation of said motor to free said holding means.

4. A device according to claim 1, including means disposed between said casing and the flying body for forcing said casing away from said flying body when said holding means is released.

5. A device according to claim 1, wherein said casing means is adapted to enclose the rear portion of said flying body, said holding means comprising a rockable lever member pivoted in said casing and having an end extending into latching engagement with said flying body, said means movable upon actuation of said winding motor including a rotatable threaded shaft, a nut member threaded on said shaft and adapted to advance therealong upon rotation thereof, said nut member being in engagement with said lever and confined against rotation thereby and being directed to displace said lever to release the end thereof in engagement with said flying body and release said casing with said winding motor from said flying body.

6. A device according to claim 1, wherein said casing includes an opening, said motor having a winding disc portion, said element being a strip adapted to be wound around said disc and extending through the opening in said casing for connection to the rotor of the gyro.

7. A device according to claim 1, wherein said casing forms a lid for closing an end of said flying body, said casing having an opening closed by a pressure-sensitive membrane.

8. A device according to claim 1, wherein said casing forms a gas-tight seal for an end of the flying body, and means for sealing said casing to said flying body.

9. A device according to claim 1, including means for spring loading said winding motor, urging the shaft thereof in a given direction of rotation, and means for blocking said winding motor against rotation.

10. A device according to claim 1, wherein said winding device includes a powder motor having a pot-shaped rotary body with tangential openings defined in the periphery thereof and a lid closing an open end thereof.

11. A device according to claim 1, wherein said holding means includes a stirrup having a U-shaped upper portion and an outer latching end portion which extends through the casing for engagement with the flying body, said means movable upon actuation of said winding motor including a threaded shaft, a nut threaded on said shaft and displaceable thereon confined within the U-shaped portion of said rocking lever and displaceable along said shaft to displace said rocking lever for displacing the latching end thereof out of engagement with said flying body.

12. In a flying body including a body portion having a trailing end with an opening, and a gyro mounted within said body, the improvement comprising a gyro winding device including a casing adapted to close the opening of said flying body, a winding motor mounted in said casing including a member windable thereby adapted to be connected to the gyro, and releaseable means holding said casing with said winding motor to said flying body.

13. In a flying body according to claim 12, wherein said casing forms a continuation of said flying body, said holding means including a resilient element hooked to said flying body at one side, and a latching element latched to said flying body at an opposite side.

14. In a flying body according to claim 12, wherein said casing includes a spring clip member extending outwardly from an outer face thereof for connection to one side of said flying body, said holding means including a lever pivotally mounted in said casing and including an arm portion extending outwardly from said casing formed as a latch engageable with said flying body at an opposite side of said resilient member.

15. In a flying body according to claim 14, wherein said winding motor includes a rotatable shaft having a threaded portion, a nut threaded over said threaded portion of said shaft, said holding means including a lever around a portion of said nut pivotally mounted in said casing and having a latching portion engageable with said flying body, said lever being displaceable by advancement of said nut during rotation of said winding motor to release said casing from said flying body.

16. In a flying body according to claim 12, wherein said winding motor includes a rotatable shaft having a threaded portion, a nut threaded onto the threaded portion of said shaft, said holding means including a lever arranged adjacent said nut and pivotally mounted in said casing with a latching end extending outwardly from said casing for latching engagement with said flying body portion, said winding motor including a winding drum portion, a strip member wound around said drum portion and extending outwardly therefrom for connection to the rotor of said gyro, said drum portion being windable upon actuation of said motor, said nut member being advanced by the winding of said motor to displace said lever member to unlatch said casing from said flying body.

17. A device according to claim 16, including resilient means disposed between said casing and said flying body for urging said casing to separate from said flying body upon release of said holding means.

18. In a flying body according to claim 12, wherein said casing includes a wall adapted to be disposed across the end of said flying body having an opening therein, a strip element extending through said opening for engagement with the rotor of said gyro.

19. In a flying body according to claim 12, wherein said casing forms an air-tight protective cover for the end of the flying body.

References Cited by the Examiner
UNITED STATES PATENTS

| | | | |
|---|---|---|---|
| 2,918,869 | 12/59 | Cumming et al. | 102—49 |
| 2,960,876 | 11/60 | Saphra. | |
| 3,024,703 | 3/62 | Herold | 89—1.7 |

BENJAMIN A. BORCHELT, *Primary Examiner.*